United States Patent [19]

Small et al.

[11] 3,918,906
[45] Nov. 11, 1975

[54] DETERMINING TOTAL IONIC CONTENT

[75] Inventors: Hamish Small; Timothy S. Stevens, both of Midland, Mich.

[73] Assignee: The Dow Chemical Company, Midland, Mich.

[22] Filed: Aug. 6, 1973

[21] Appl. No.: 386,263

[52] U.S. Cl. ........ 23/230 R; 23/253 R; 73/61.1 C; 210/25; 210/31 C; 210/37; 210/38; 210/284; 210/294
[51] Int. Cl.² .................. G01N 27/08; G01N 31/04; G01N 31/08
[58] Field of Search ........ 23/230 R, 253 R; 210/24, 210/25, 31 C, 37, 38, 284, 294; 127/9; 73/61.1 C

[56] References Cited
UNITED STATES PATENTS

| | | | |
|---|---|---|---|
| 2,617,766 | 11/1952 | Emmett | 210/25 |
| 2,950,176 | 8/1960 | Thayer | 23/230 R |
| 3,382,034 | 5/1968 | Kraus | 210/24 X |
| 3,495,943 | 2/1970 | Kapff | 23/230 R |
| 3,676,106 | 7/1972 | Hazen | 210/24 X |
| 3,694,369 | 9/1972 | Orlandini | 210/38 X |

Primary Examiner—Morris O. Wolk
Assistant Examiner—Sidney Marantz
Attorney, Agent, or Firm—Edward E. Schilling

[57] ABSTRACT

Method of determining total ionic content of an aqueous sample solution by an ion exchange procedure in which all of the cationic species present are converted to an easily eluted alkali metal cation in a first ion exchange resin bed means after which the anions in the aqueous sample are all exchanged in an anion exchange resin bed means for an easily eluted anion, such as hydroxide or acetate, thereby exchanging all ion species in the sample solution for a single predetermined ion pair and thereafter determining the ion concentration of such ion pair utilizing responsive detector means such as a conductivity cell having associated readout means.

The apparatus includes two ion exchange columns and a detector such as a conductivity cell connected in series by liquid conduit means, means for adding liquid sample solution and water as eluant to the first column and readout means associated with the conductivity cell. The apparatus is made ready for use by charging the first column with cation exchange resin in the sodium or lithium form or other easily elutable cation, while the second column is charged with an anion exchange resin in the hydroxide or acetate, other easily elutable anion, forms.

4 Claims, 1 Drawing Figure

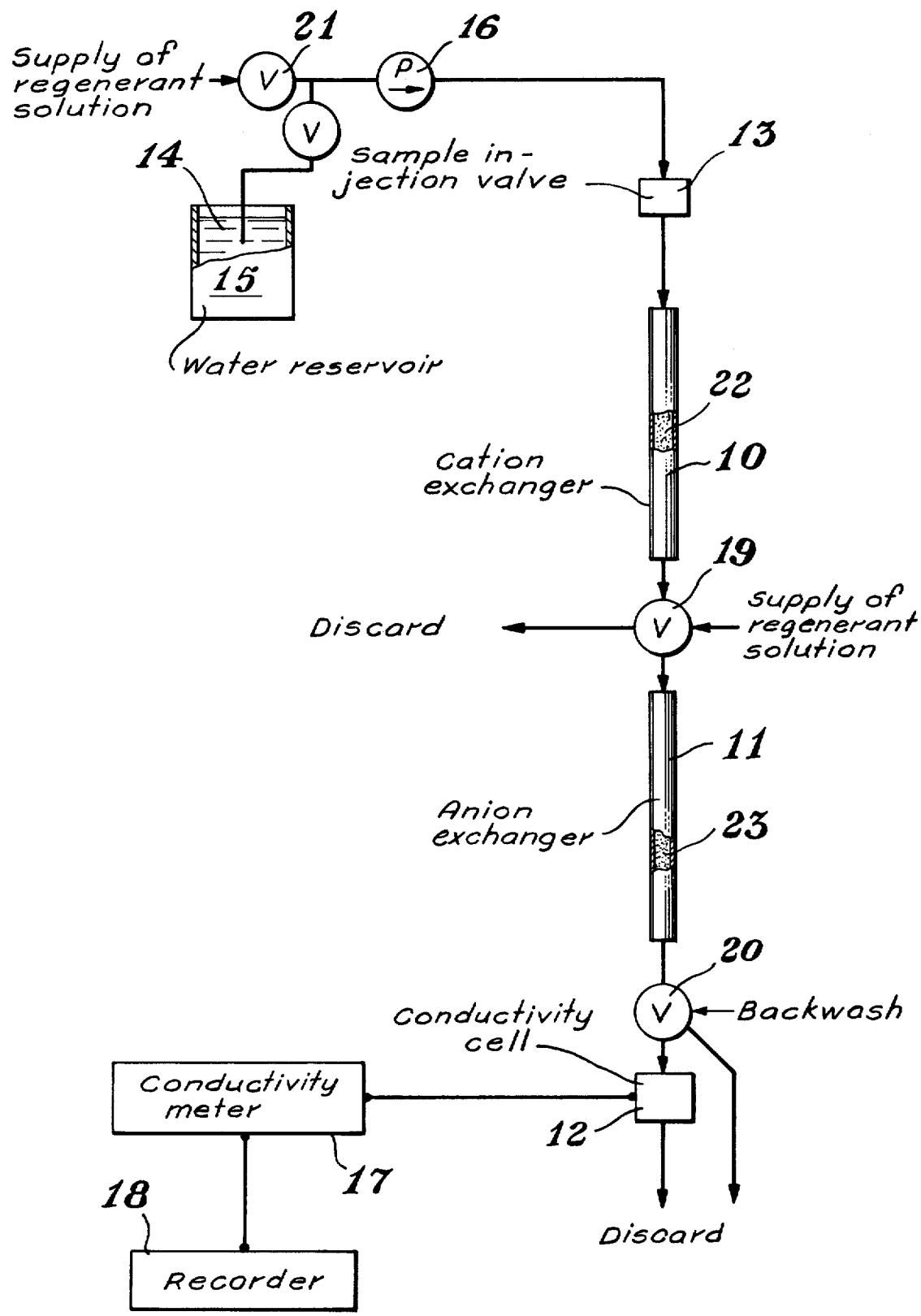

DETERMINING TOTAL IONIC CONTENT

CROSS REFERENCE TO RELATED APPLICATIONS

In a copending application of Hamish Small and William C. Bauman, Ser. No. 386,260, filed even date herewith, there is described a method for quantitative analysis by chromatography of ionic species in solution wherein the solution is passed first through a separator ion exchange resin bed means preferably of limited total capacity and then through a stripper ion exchange resin means preferably of high capacity and thence, substantially freed of all highly ionized materials except the ions to be determined and their counter valent ions through a detector such as a conductivity cell having associated readout means.

In an additional copending application of Timothy S. Stevens and Hamish Small, Ser. No. 386,261, filed even date herewith, there is described a method for quantitative analysis by chromatography of cationic species in solution wherein cations are chromatographically resolved in a separator cation exchange resin bed means on elution with either silver nitrate or barium chloride solution after which the effluent from the first resin bed is passed through a stripper anion exchange resin bed means charged with an anion exchange resin in either the chloride or the sulfate form of sufficient capacity to precipitate all of the silver ion or barium ion used for elution. The effluent from the stripper bed is passed through a suitable detector such as a conductivity cell having associated readout means.

In a copending application of Timothy S. Stevens, Ser. No. 386,262, filed even date herewith, there is described a method for quantitative analysis of cationic species in solution using a chromatographic method in which the cation species are chromatographically resolved on a separator cation exchange resin bed using a solution of mixed developing reagents: (1) $AgNO_3$ + $HNO_3$, or, (2) $BaCl_2$ + $HCl$, whereby cations such as protonated amines are readily maintained in ionic form so that chromatographic separation may be achieved, after which the effluent from the separator ion exchange resin bed is passed through a first stripper bed containing anion exchange resin in either the chloride or the sulfate form whereby the silver ion or barium ion is precipitated and thereafter passing the effluent from such stripper bed to a second stripper bed containing anion exchange resin in the hydroxide form whereby all of the hydronium ion of the developing reagent solution is neutralized. The effluent from the second stripper bed is passed through a suitable detector such as a conductivity cell having associated readout means.

BACKGROUND OF THE INVENTION

1. Field of the Invention

The invention relates to ion exchange apparatus and method for very rapidly approximating the total dissolved solids content of an aqueous sample solution. The invention more particularly relates to ion exchange apparatus and method for determining the total number of equivalents of dissolved ionic materials in aqueous sample solution, such number correlating rather closely to the per cent by weight of all dissolved salts in an aqueous sample such as a surface water sample or a typical industrial plant effluent.

2. Description of the Prior Art

There is a constant and ever increasing demand for analysis of surface waters, boiler feed water and manufacturing plant effluents for total dissolved solids content as a measure of water purity for various intended purposes and reasons. The standard methods long utilized generally involve drying a measured quantity such as a 100 milliliter quantity of a filtered portion of solution in a tared dish and weighing the residue. Usually drying is carried out at 105° to 110°C. or 180°–2°C., and the method suffers from the difficulty that water of hydration is frequently not driven off at these temperatures and must be determined as by a Karl Fischer titration and correction made. The method generally requires about 4–16 hours of elapsed time for its completion so that answers are not available in a hurry and furthermore may require about 45 to 60 minutes of analyst's time, net, per sample run in duplicate so that the method is relatively expensive when run on a large scale. So far as is known, no method has been available heretofore for the rapid readily automated relatively inexpensive reliable determination of total dissolved solids. Conductivity tests have been used but are not consistently reliable because of widely varying specific conductance among component ions. Therefore, a new approach appears to be needed.

SUMMARY OF THE INVENTION

It has now been discovered that total ionic content of an aqueous sample solution which is an independent value, but which can be correlated closely to total dissolved solids content of such solution is readily and expeditiously carried out in times usually approximating no more than about 5 minutes utilizing ion exchange means upon adding a predetermined amount of sample solution to a cation exchange resin bed means, the resin bed being charged with a cation exchange resin in the form of an easily elutable cation and eluting the cations of the sample from the cationic exchange resin bed means with water, passing the effluent from the cation exchange resin bed means to and through an anion exchange resin bed means charged with an anion exchange resin in the form of an anion that is very easily eluted therefrom thereby exchanging all anionic species present to a single anion form, the total exchange capacity of the cation and anion exchange resins being sufficient to at least free substantially by ion exchange a number of equivalents of a single easily eluted cation and a single easily eluted anion corresponding to the number of equivalents of ionically dissociated compounds in the predetermined amount of sample solution, and passing the effluent from the anion exchange resin bed means through responsive detector means having associated readout means and thereby quantitatively measuring the eluted quantity of single cation and associated single anion.

The present apparatus includes two ion exchange columns and a detector such as a conductivity cell connected in series by liquid conduit means, means for adding liquid sample solution and water for elution to the first column and readout means sssociated with the detector such as a conductivity cell, the first ion exchange column being charged with a cation exchange resin in the form of a very easily elutable cation and the second ion exchange column being charged with an anion exchange resin in the form of an easily elutable anion. The total exchange capacity of each of the resin beds must be sufficient to accommodate all of the dissociated compounds dissolved in the sample whereby all of the ionic materials present are substantially converted to a single predetermined ion pair having a known response from the detector. The value obtained by the present total ionic content method correlates quite well with determinations of total dissolved solids by the classical methods for specific sample streams. The correlation factor would need to be determined for each stream, but once determinted it would not be expected to vary significantly for most sample streams.

BRIEF DESCRIPTION OF THE DRAWING

The single FIGURE of the drawing is a schematic representation of an embodiment of the apparatus of the invention showing a reservoir for water which serves as eluant, a pump, an injection valve such as a special injection valve regularly used for ion exchange and chromatographic separations, a first ion exchange column, a second ion exchange column and a detector such as a conductivity cell, all connected in series by liquid conduit means.

FURTHER DESCRIPTION OF THE INVENTION

The present method and apparatus are well adapted for the rapid and easily automated analysis of the total ionic content of an aqueous sample solution and is, for example, readily carried out at remote locations or by relatively untrained personnel. The method is effective for the ion exchange transformation and determination of any ionic material in solution or any material which is less than completely dissociated but readily dissociates and reacts with an ion exchange resin. The method is readily carried out on most any aqueous sample such as a sample of surface waters, boiler blow down water or aqueous plant effluent from a manufacturing plant. More concentrated samples such as brines and sea water samples are also analyzable according to the present method, although a much smaller sample size is generally utilized for more concentrated samples, e.g., 2 to 10 microliters of sample solution. A sample size of the order of 0.1 milliliter is indicated for the analysis of water of the ionic material content level of good drinking water. For most natural fresh surface waters suitable sample sizes are in the range of about 10 to about 50 microliters. In each case, it is preferred to use as small sample size as is reasonably convenient to handle consistent with good instrument practice on signal to noise ration. Smaller samples do not exhaust the resin beds as rapidly as larger samples.

Referring now to the single FIGURE of the drawings, the apparatus of the invention is seen basically to consist of a first ion exchange column 10 arranged in series with a second ion exchange column 11 followed by a conductivity cell or other suitable detector 12 all connected by liquid conduit means. Sample may be placed on or added to the column 10 in most any suitable manner as by the use of a pipet or a buret and eluted with eluant added from, for example, a buret, and the process carried on by a gravity flow system. Preferably, by means of a syringe (not shown), the sample is added to the system at sample injection valve 13.

The sample injection valve 13 is of a type commonly used for adding sample to the column in carrying out chromatographic separations or ion exchange operations and typically is provided with a bore in the valve plug or a loop of tubing connected to two of the valve body ports either of which, i.e., the bore or the loop of tubing, determines sample size which is subsequently swept out by the eluant as well understood in the art when the valve plug bore or the loop of tubing, on manipulation of the valve, is placed in series with a stream of the eluant leading to the first ion exchange column and the selected sample portion is thereby swept on into the ion exchange column.

In the present apparatus, the sample injected at injection valve 13 is swept through the apparatus by water 14 which serves as eluant and is drawn from a reservoir 15 or other suitable source of supply by pump 16 and passed through the sample injection valve 13 to the first ion exchange column 10. As indicated above, the eluant water may be added to the first column manually as by pouring the water from a vessel into an open column but is preferably added in a continuous stream to obtain better uniformity and reproducibility of results. The effluent leaving the ion exchange column 10 with all of the cationic species exchanged for a single easily elutable cation is conveyed by liquid conduit means to the ion exchange column 11 wherein the anions present in the solution sample are exchanged for a single easily elutable anion. The effluent from the anion exchange column 11 is lead by liquid conduit means to a suitable detector such as a conductivity cell 12 wherein the total amount of the single predetermined or preselected ion pair species issuing from the preceding two columns is readily determined as a single concentration peak as shown by the associated readout means. The readout means represented in the drawing, schematically, is a conductivity meter 17 and a recorder 18 associated with the conductivity cell. The recorder 18 is preferably a recorder-integrator.

The cation exchange resin 22 employed in the first chromatographic column 10 will ordinarily be placed in either the lithium or sodium ion form since these cations are amongst the most easily elutable cations, although other cations such as potassium ion may be usable with some samples containing substantially only cations that will displace potassium ions. The anion exchange resin 23 in the second chromatographic column 11 is ordinarily placed in either the hydroxide form or the acetate form since these anions are amongst the most easily elutable anions and will be readily displaced by any other anion. Like ions of course in the original sample will produce an effect as if they had not exchanged and will make their proper net contribution to the determination of total ionic content.

While it is sufficient for a single determination that each ion exchange column contain ion exchange resin with sufficient capacity to exchange all ions in the sample differing from those in the form of the resin, as a practical matter it is much preferred that the quantity of ion exchange resin employed in each bed have a sufficient total capacity to permit the analysis of a very large number of samples before regeneration of the resin is required to put it in its original ion form. As a practical manner each ion exchange column should be charged with sufficient resin to permit, without regeneration, the analysis of at least five samples, much more preferably at least 1000 samples, and even more preferably at least 5000 samples, and even more is desirable and attainable, as experience shows, the columns are readily charged with sufficient high capacity ion exchange resin to accommodate 10,000 samples when small sample sizes such as 10 to 50 microliters of solution are used.

Periodically as either or both of the ion exchange resins being used approach exhaustion, it is necessary to either replace or regenerate each bed to place it back into the desired ion form. If time demands upon the use of the instrument are quite great, it may be desirable to keep on hand an inventory of columns containing the resin beds in the fully regenerated form. On the other hand, if desired, the resin beds can be regenerated in place without dismantling the apparatus. Regeneration is carried out by reversing the ion exchange process that takes place during analytical determinations. This is accomplished by bringing into contact with the ion exchange resin a relatively concentrated solution, for example, about 1 to 5 molar, of the ion to be established at the ion exchange sites. The ion of interest may be one that is paired with most any suitable counter valent ion so long as the resulting ion pair is quite soluble in water. Thus, the cationic exchange resin may be washed, or soaked if necessary to achieve better replacement, with a solution of lithium chloride while the anion exchange resin may, for example, be washed with a solution of sodium hydroxide. On the other hand, it is entirely possible to wash both columns at once with the same solution upon using an ion pair made up of ions each suitable for regenerating one of the beds. Examples of such ion pairs are lithium hydroxide, lithium acetate, sodium hydroxide or sodium acetate. However, it is best to first acid wash the cation exchange resin, in this case, before placing in the sodium or lithium form. If desired, the acid wash can simply be passed through both columns before adding the fluid regenerant solution.

Referring now to the single FIGURE of the drawing, regeneration of the cation exchange resin in column 10 is carried out upon drawing in regenerate solution such as aqueous solution of lithium chloride through valve 21 to the pump 16 thence through the bypass of the portion of the sample injection valve 13 and into the column 10, the effluent leaving by way of valve 19 and being directed to discard. Similarly, regenerate solution for the anion exchange resin in column 11 can, by a suitable pump, or gravity flow, be directed in through valve 19 to column 11, the effluent leaving by way of valve 20 and being directed to discard. On the other hand, if the ion pair is appropriate for regeneration of both columns with a single regenerant solution, the regenerant solution drawn into the line through valve 21 is simply directed on through column 10 to column 11 and out at valve 20 to discard after first acid washing both resin beds with, e.g., dilute hydrochloric acid. If desired, either both of the columns may be backwashed initially to loosen and fluff up the resin beds in order to avoid channeling phenomenon.

It must be understood that the columns shown in the drawing are ordinarily small diameter tubing, usually of glass or stainless steel, the small diameter, together with fast flow rates of water serving as eluant, facilitating analysis times of generally no greater than about 5 minutes, though longer times may be required depending upon instrument design. For the purposes of the present discussion and the appended claims, small diameter columns are those having an internal diameter (I.D.) of not more than about 3 millimeters. Larger diameter columns may be used if desired, such as columns having an I.D. of 25 or 50 millimeters but, generally one does not use such large columns and it is preferred to use a column with an I.D. not greater than about 10 millimeters.

In carrying out the present method, the sample size selected is preferably rather small in order to facilitate rapid determinations, to avoid unnecessary exhaustion of the ion exchange beds, and further, to get sharp peak concentrations of eluted ion pairs to be detected at the detector. Further, since the detectors available, especially the conductivity cell, are very sensitive, sample size can indeed be quite small. A syringe is conveniently used to inject the portion of the sample solution into the sample injection valve which measures out, e.g., from about 0.002 to about 1 milliliter of the solution to be analyzed. More generally, the sample size is in the range of about 10 to 50 microliters for fresh surface waters and in the range of 2 to 10 microliters in the case of sea water and brines. Typically, conveniently and preferably the number of milliequivalents of ionic material in the sample portion does not exceed about 1/500, more preferably 1/2500, and even more preferably not more than 1/5000 of the total exchange capacity of each of the ion exchange resin beds employed.

While it is possible to add the sample portion selected to the first ion exchange column manually and to add water to the column from a pipet or buret or even a beaker and to depend on gravity flow operations, it is much preferred for the sake of reproducibility, convenience and speed to use a pump and to supply with a closed system a substantially continuous stream of water as eluant and to carry out sample injection and elution according to good current chromatographic or ion exchange practice in which the eluant is used to sweep the sample out of the sampling valve and on to the column. Typical flow rates for the eluant water fall generally in the range of about 20 to 500 milliliters per hour when the columns used are sized in the range of about 2.8 to 9 millimeter I.D.

The ion exchange resins to be used in each of the columns according to the present invention may each by any of the generally used, preferably high capacity, ion exchange resins commercially available such as Dowex 50W and Dowex 1 ion exchange resin. These ion exchange resins are typically polystyrene or modified polystyrene copolymers cross-linked, for example, with divinylbenzene, and carrying nuclear groups, the latter providing the active exchange sites. The strong cation exchange resins carry nuclear sulfonic acid or sulfonate groups along the polymer chain. The strong base anion exchange resins carry nuclear chloromethyl groups which have been quaternized.

For further information on ion exchange theory, processes and resin synthesis, reference is made to the monograph "Dowex: Ion Exchange" 3rd Ed., 1964, published by The Dow Chemical Company, Midland, Mich., and the two volume work "Ion Exchange" edited by Jacob A. Marinsky and published by Marcel Dekker Inc., New York, 1966. Chapter 6, vol. 2 of "Ion Exchange" is devoted to a description of synthesis of ion exchange resins of various types usable herein in each of the ion exchange columns.

It must be understood that either or both of the ion exchange beds used herein may, if desired, be disposed in two columns per bed connected in series and providing the requisite amount of ion exchange resin as would normally be provided in one column per bed, and such two column beds are considered to be merely an obvious equivalent of single column beds and within the scope of the appended claims, no advantage accruing from such arrangement. On the other hand, both resins may be disposed in separate layers in a single column and such an arrangement is considered to be within the scope of the appended claims.

The following examples serve to illustrate the use of the method and apparatus of the invention and the scope of the invention is not intended to be limited thereto.

EXAMPLE 1

A 9 × 250 millimeter (mm) glass column was filled with a commercial cation exchanger, Dowex 50WX8, 200–400 mesh in the sodium ion form. A second column of the same dimensions was filled with Dowex 1X8, 200–400 mesh in the hydroxide ion form and connected to the first column. The first column was provided with a sample injection valve, pump and eluant reservoir while the effluent from the second column was directed to a conductivity cell and readout means all substantially following the scheme of the drawing. Samples of aqueous solutions of sodium chloride of various concentrations were injected to the first column by means of the sample injection valve and eluted through both columns using deionized water as eluant at a flow rate of 460 ml/hr. The height of the eluted conductivity peaks were measured and found to be approximately proportional to the concentrations of the samples injected.

EXAMPLE 2

Using the same columns and apparatus of Example 1, several samples of a waste treatment plant effluent obtained on different dates were eluted using deionized water as eluant and the heights of the eluted conductivity peaks measured. By using injections of sodium chloride solutions of accurately known concentration, the heights of the conductivity peaks of the waste control plant samples were converted into equivalent ionic content (total ionic content). These total ionic content values were then correlated with the values for the total dissolved solids content of the samples, obtained by evaporating filtered samples to dryness and correcting for water of hydration in the dried samples. These results are provided in the accompanying table which illustrates the strong correlation between the total ionic content as determined by the method described herein and the total dissolved solids content determined by evaporation and drying. The relative constancy of the correlation factor attests to the strength of the correlation.

| Sample Number | Total Ionic Content meqs/l | Total Dissolved Solids parts per million | Correlation Factor |
|---|---|---|---|
| 1 | 122 | 3200 | 26.2 |
| 2 | 101 | 2800 | 27.7 |
| 3 | 101 | 2700 | 26.7 |
| 4 | 115 | 3300 | 28.7 |
| 5 | 116 | 2900 | 25.0 |
| 6 | 103 | 2800 | 27.2 |
| 7 | 120 | 3100 | 25.8 |
| 8 | 97 | 2600 | 26.8 |

-continued

| Sample Number | Total Ionic Content meqs/l | Total Dissolved Solids parts per million | Correlation Factor |
|---|---|---|---|
| 9 | 93 | 2500 | 26.9 |
| 10 | 82 | 2300 | 28.0 |
| 11 | 83 | 2300 | 27.7 |

We claim:
1. The method of determining total ionic content in an aqueous solution by quantitative analysis of a plurality of ionically dissociated compounds in the aqueous sample solution utilizing ion exchange procedures, which comprises:

adding a predetermined amount of said sample solution to a cation exchange resin bed means, said resin bed means being charged with a cation exchange resin in easily elutable cation form capable of exchanging with the cations of the sample and delivering only one species of cation on elution;

eluting from said resin bed means with water a congregated quantity of said easily elutable cations corresponding equivalent per equivalent to the number of equivalents of ion material dissolved in the said predetermined amount of sample solution;

passing the effluent from the cation exchange resin bed means through an anion exchange resin bed means, said latter resin bed means being in easily elutable anion form capable of exchanging with the anions of the sample and delivering only one species of anion on elution thereby exchanging all anionic species in said effluent for such easily elutable ions;

the total exchange capacity of the cation and anion exchange resins being sufficient to at least free, by ion exchange, a number of equivalents of each of the easily elutable cations and anions corresponding to the said number of equivalents of ionically dissociated compounds in the predetermined amount of sample solution;

and passing the effluent from the anion exchange resin bed means through a conductivity cell having associated readout means and thereby quantitatively measuring the congregated quantity of easily elutable cations and anions.

2. The method as in claim 1 wherein the cation exchange resin and the anion exchange resin are each employed in a quantity sufficient to exchange the total ionic content of at least five predetermined amounts of sample solution.

3. The method as in claim 1 wherein the cation exchange resin and the anion exchange resin are each employed in a quantity sufficient to exchange the total ionic content of at least 1000 predetermined amounts of sample solution.

4. The method as in claim 1 wherein the cation exchange resin is in one of the $Na^+$ and the $Li^+$ form while the anion exchange resin is in one of the $OH^-$ and the $CH_3COO^-$ form.

* * * * *